US012117850B2

(12) United States Patent
Sato et al.

(10) Patent No.: US 12,117,850 B2
(45) Date of Patent: Oct. 15, 2024

(54) MOVING OBJECT AND ROUTE DECISION METHOD OF MOVING OBJECT

(71) Applicants: TOYOTA JIDOSHA KABUSHIKI KAISHA, Toyota (JP); School Judicial Person IKUTOKU GAKUEN, Atsugi (JP)

(72) Inventors: Daisuke Sato, Toyota (JP); Takanobu Nasu, Toyota (JP); Toshihiro Wakita, Atsugi (JP)

(73) Assignees: TOYOTA JIDOSHA KABUSHIKI KAISHA, Toyota (JP); SCHOOL JUDICIAL PERSON IKUTOKU GAKUEN, Atsugi (JP)

( * ) Notice: Subject to any disclaimer, the term of this patent is extended or adjusted under 35 U.S.C. 154(b) by 296 days.

(21) Appl. No.: 17/741,965

(22) Filed: May 11, 2022

(65) Prior Publication Data

US 2022/0371582 A1 Nov. 24, 2022

(30) Foreign Application Priority Data

May 18, 2021 (JP) ................................ 2021-084192

(51) Int. Cl.
*G05D 1/622* (2024.01)
*G05D 1/00* (2006.01)

(52) U.S. Cl.
CPC ........... *G05D 1/622* (2024.01); *G05D 1/0214* (2013.01)

(58) Field of Classification Search
None
See application file for complete search history.

(56) References Cited

U.S. PATENT DOCUMENTS

2017/0017237 A1  1/2017  Tokuyama et al.
2019/0086226 A1  3/2019  Hamada et al.
(Continued)

FOREIGN PATENT DOCUMENTS

JP  2012-048288 A   3/2012
JP  2012-243029 A  12/2012
(Continued)

OTHER PUBLICATIONS

Fox, D.Burgard, W. Thrun, S., "The Dynamic Window Approach to Collision Avoidance", IEEE Robotics and automation magazine, 4(1)(1997), p. 1-p. 23.

*Primary Examiner* — Stephen Holwerda
*Assistant Examiner* — Bryant Tang
(74) *Attorney, Agent, or Firm* — Dinsmore & Shohl LLP

(57) ABSTRACT

A moving object that travels from a current position toward a target position includes a first section candidate searching unit configured to search for a plurality of first section candidates in which the moving object is capable of traveling from the current position, a second section candidate searching unit configured to, for each ending point of the first section candidates, search for a plurality of second section candidates in which the moving object is capable of traveling from the ending points of the first section candidates, an obstacle position recognition unit configured to detect a position of an obstacle around the moving object, and a route decision unit configured to decide a first section and a second section used as a traveling route of the moving object from the plurality of first section candidates and the plurality of second section candidates.

8 Claims, 8 Drawing Sheets

(56) References Cited

U.S. PATENT DOCUMENTS

| | | | |
|---|---|---|---|
| 2020/0097010 A1* | 3/2020 | Maila | ................ B60W 50/029 |
| 2020/0310444 A1 | 10/2020 | Hasegawa et al. | |
| 2020/0317193 A1 | 10/2020 | Ueda | |

FOREIGN PATENT DOCUMENTS

| | | | |
|---|---|---|---|
| JP | 2020-160603 A | 10/2020 | |
| JP | 2020-534616 A | 11/2020 | |
| JP | 2020-534621 A | 11/2020 | |
| WO | WO-2015151266 A1 * | 10/2015 | ............. G05D 1/024 |
| WO | WO-2017168662 A1 * | 10/2017 | ............. G01C 21/20 |
| WO | 2019/021437 A1 | 1/2019 | |
| WO | 2019/060679 A1 | 3/2019 | |
| WO | 2019/060700 A1 | 3/2019 | |

* cited by examiner

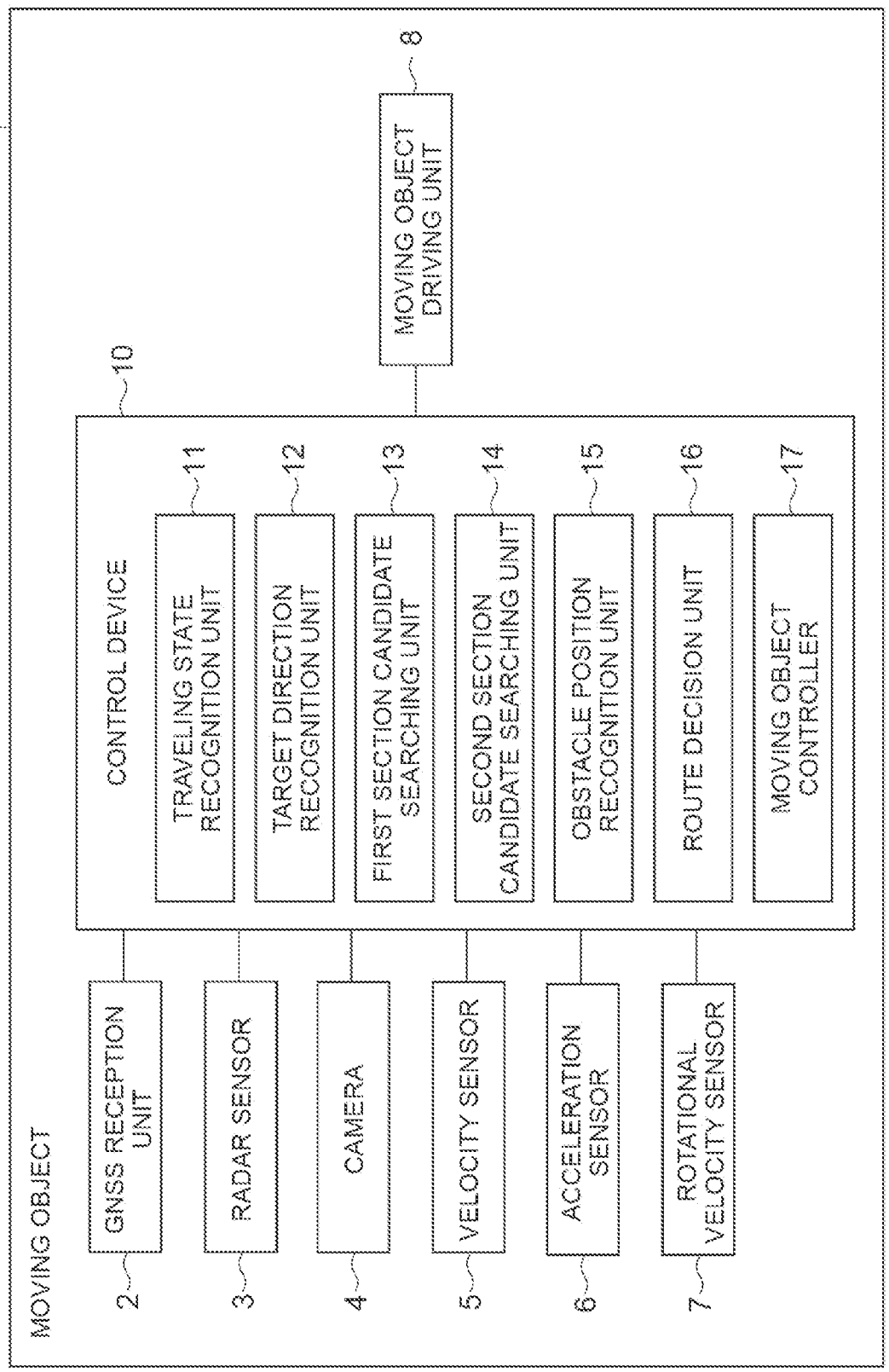

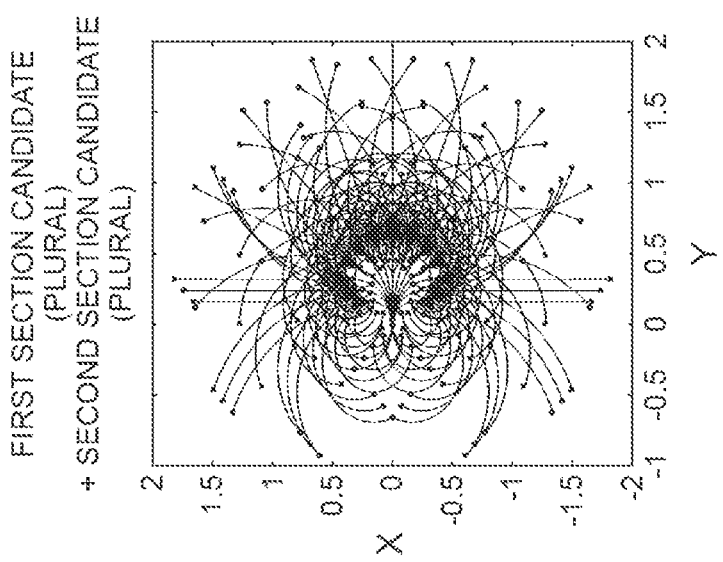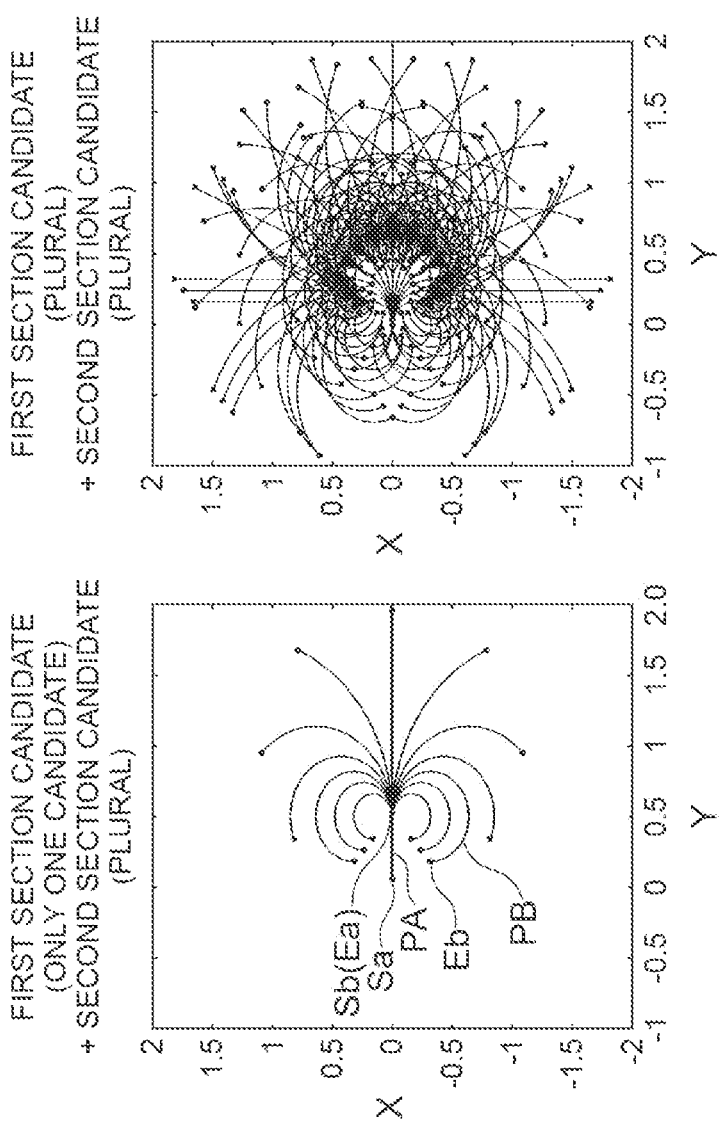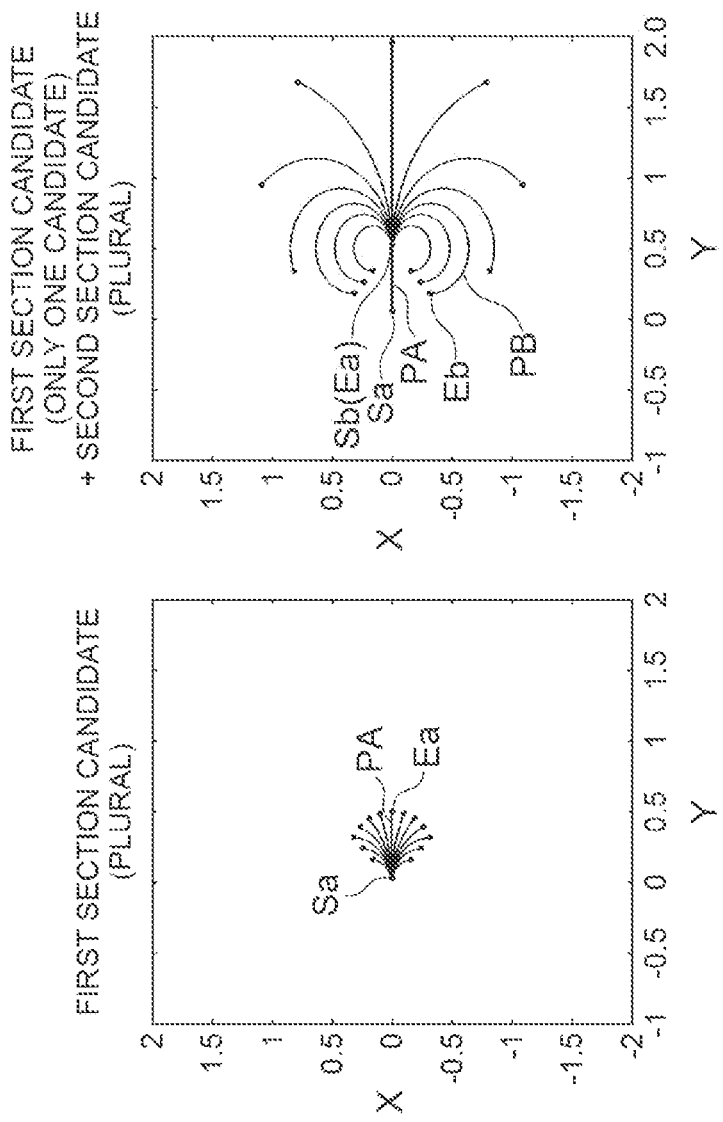

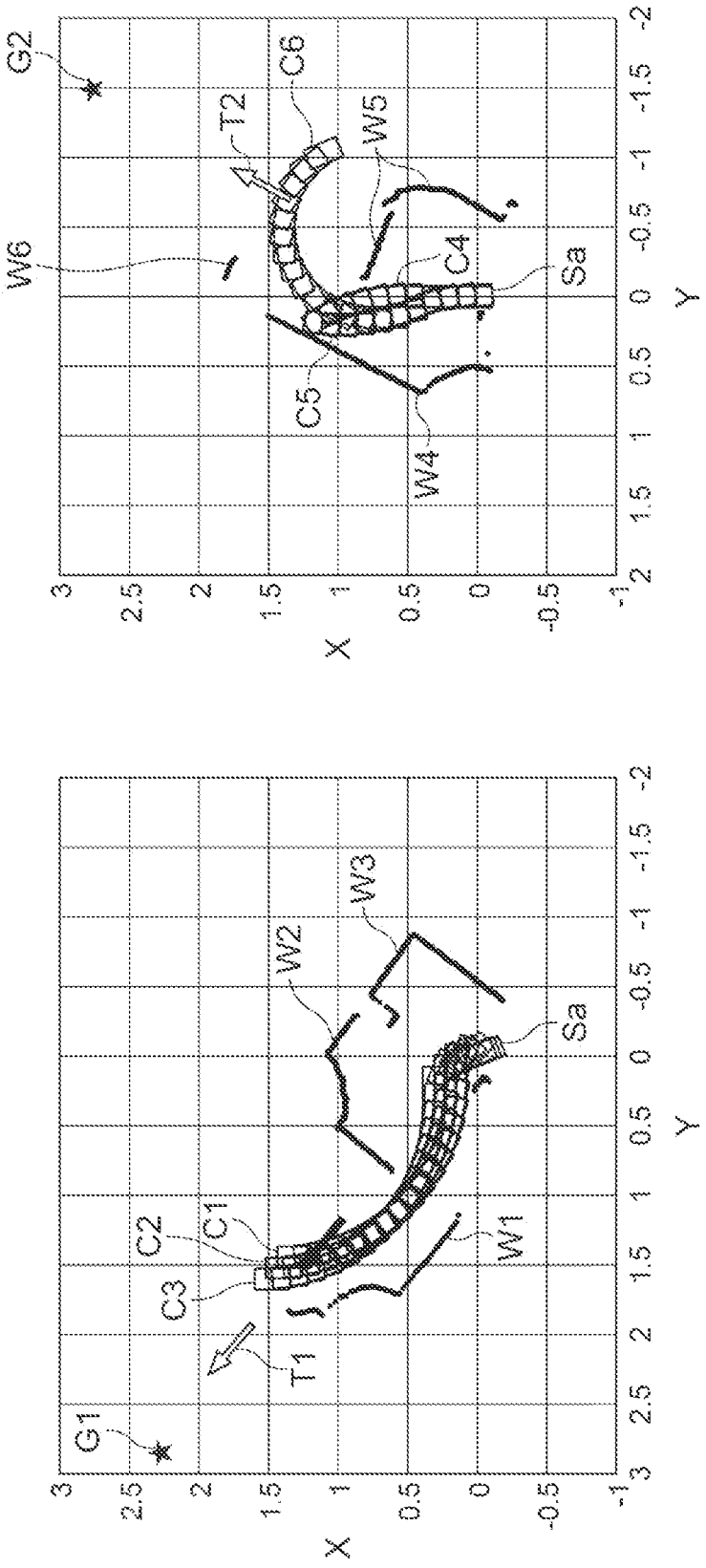

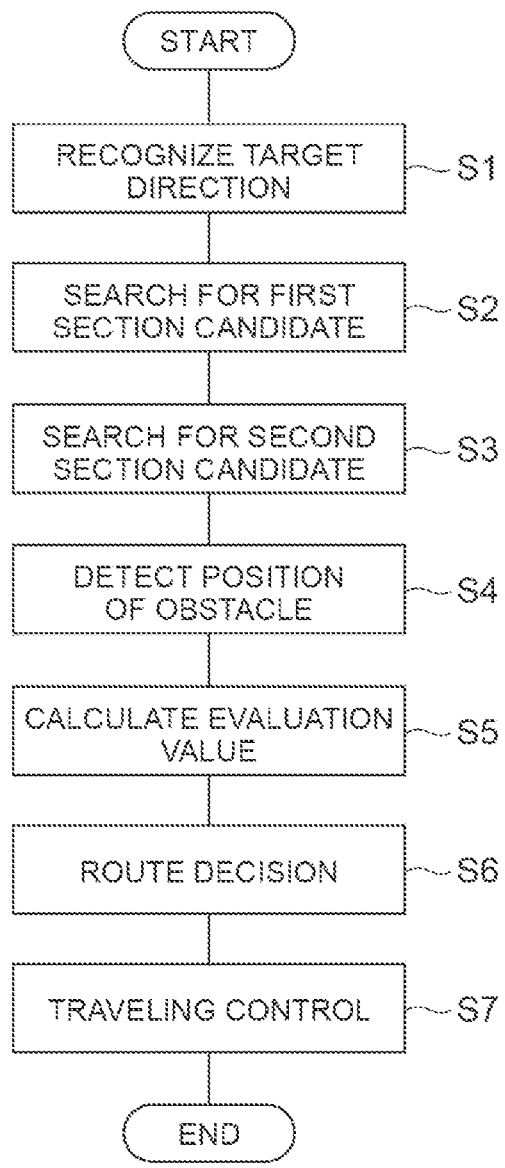

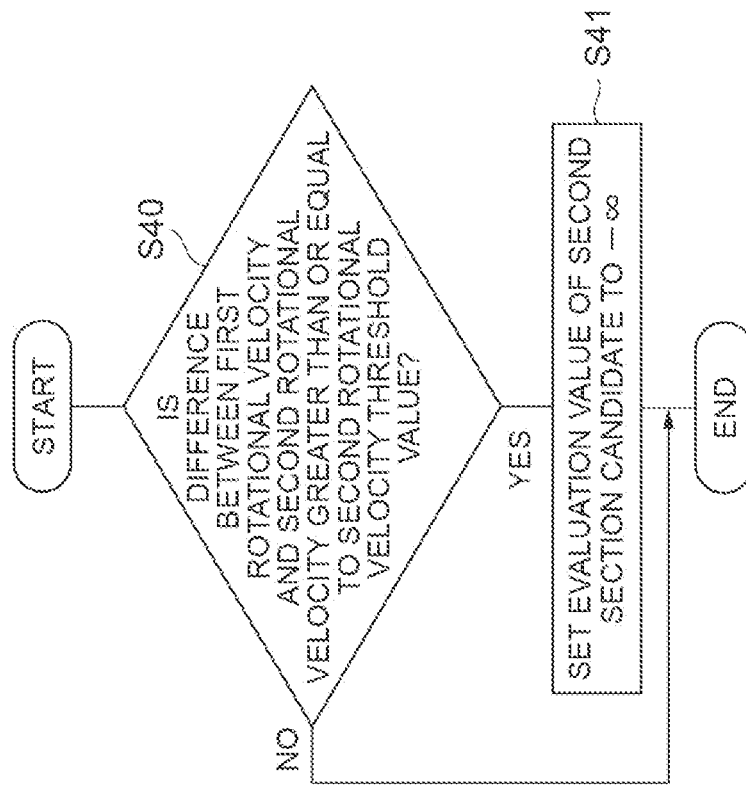
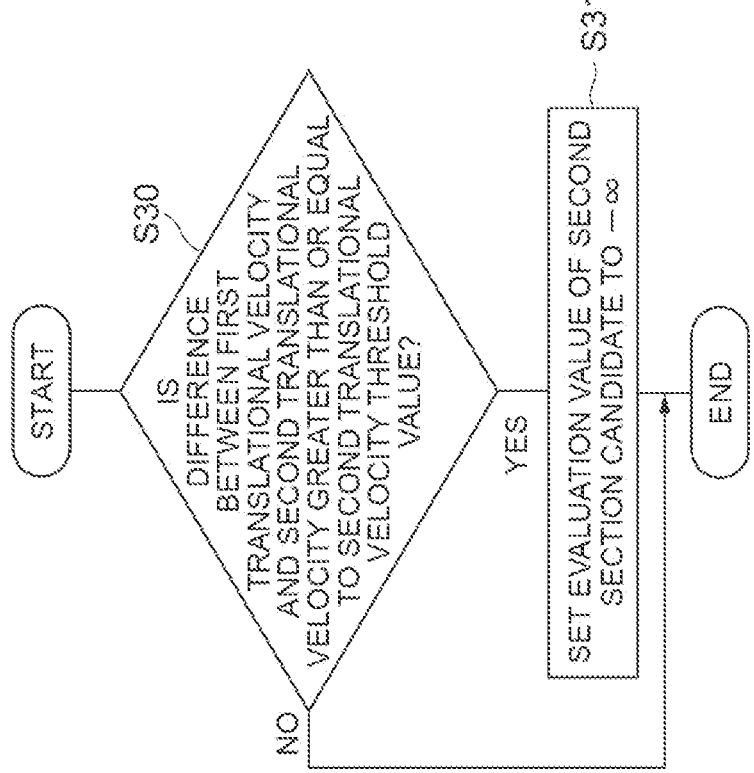

MOVING OBJECT AND ROUTE DECISION METHOD OF MOVING OBJECT

TECHNICAL FIELD

The present disclosure relates to a moving object and a route decision method of a moving object.

CROSS-REFERENCE TO RELATED APPLICATION

This application claims the benefit of priority from Japanese Patent Application No. 2021-084192, filed May 18, 2021, the entire contents of which are incorporated herein by reference.

BACKGROUND

In the related art, Japanese Unexamined Patent Publication No. 2012-243029 has been known as a technical literature related to route decision of a moving object. This publication discloses generation of a plurality of candidates of a local route returning to a global route by avoiding an obstacle when the obstacle is detected forward of a moving object that generates the global route for reaching a final target location from a current position.

For each of the generated plurality of candidates of the local route, the moving object calculates an evaluation value from an angle with respect to the final target location, a movable velocity, and a distance to the obstacle and employs a candidate having the highest evaluation value as the local route for avoiding the obstacle. In addition, this publication discloses use of the dynamic window approach (DWA) in generating the route candidates.

SUMMARY

However, the moving object of the related art poses a problem in that only relatively simple routes can be generated, and a route that enables smooth movement when entering a narrow road or the like cannot be obtained.

An aspect of the present disclosure is a moving object that travels from a current position toward a target position, the moving object including a first section candidate searching unit configured to search for a plurality of first section candidates in which the moving object is capable of traveling from the current position within a first set time period set in advance, a second section candidate searching unit configured to, for each ending point of the first section candidates, search for a plurality of second section candidates in which the moving object is capable of traveling from the ending points of the first section candidates within a second set time period set in advance, a target direction recognition unit configured to recognize a target direction that is a direction in which the target position is present, an obstacle position recognition unit configured to detect a position of an obstacle around the moving object, and a route decision unit configured to decide a first section and a second section used as a traveling route of the moving object from the plurality of first section candidates and the plurality of second section candidates based on the target direction and the position of the obstacle.

According to the moving object according to the aspect of the present disclosure, by searching for the route including at least the first section candidates and the second section candidates in a plurality of steps to decide the first section and the second section used as the traveling route of the moving object, a route that has high flexibility and can be smoothly traveled by the moving object can be obtained compared to the technology of the related art in which the route is searched in only one step.

The moving object according to the aspect of the present disclosure may further include a traveling state recognition unit configured to recognize a translational velocity of the moving object at the current position, in which the route decision unit is configured to decide the first section for which a difference between the translational velocity of the moving object at the current position and a first translational velocity that is a translational velocity of the moving object in the plurality of first section candidates is less than a first translational velocity threshold value.

The moving object according to the aspect of the present disclosure may further include a traveling state recognition unit configured to recognize a rotational velocity of the moving object at the current position, in which the route decision unit is configured to decide the first section for which a difference between the rotational velocity of the moving object at the current position and a first rotational velocity that is a rotational velocity of the moving object in the plurality of first section candidates is less than a first rotational velocity threshold value.

In the moving object according to the aspect of the present disclosure, the route decision unit may be configured to decide the second section for which a difference between a second translational velocity that is a translational velocity of the moving object in the plurality of second section candidates from an ending point of the decided first section as a starting point and a first translational velocity that is a translational velocity of the moving object in the first section is less than a second translational velocity threshold value.

In the moving object according to the aspect of the present disclosure, the route decision unit may be configured to decide the second section for which a difference between a second rotational velocity that is a rotational velocity of the moving object in the plurality of second section candidates from an ending point of the decided first section as a starting point and a first rotational velocity that is a rotational velocity of the moving object in the first section is less than a second rotational velocity threshold value.

Another aspect of the present disclosure is a route decision method of a moving object that travels from a current position toward a target position, the route decision method including searching for a plurality of first section candidates in which the moving object is capable of traveling from the current position on a first velocity condition set in advance within a first set time period set in advance, searching, for each ending point of the first section candidates, for a plurality of second section candidates in which the moving object is capable of traveling from the ending points of the first section candidates on a second velocity condition set in advance within a second set time period set in advance, recognizing a target direction that is a direction in which the target position is present, detecting a position of an obstacle around the moving object, and deciding a first section and a second section used as a traveling route of the moving object from the plurality of first section candidates and the plurality of second section candidates based on the target direction and the position of the obstacle.

According to the route decision method of the moving object according to the other aspect of the present disclosure, by searching for the route including at least the first section candidates and the second section candidates in a plurality of steps to decide the first section and the second section used as the route, a route that has high flexibility and can be smoothly traveled by the moving object can be obtained compared to the technology of the related art in which the route is searched in only one step.

According to the aspect and the other aspect of the present disclosure, a route that has high flexibility and can be smoothly traveled by the moving object can be obtained compared to the technology of the related art in which the route is searched in only one step.

BRIEF DESCRIPTION OF THE DRAWINGS

FIG. 1 is a block diagram illustrating a moving object according to one embodiment.

FIG. 2A is a diagram illustrating an example of a search result of a plurality of first section candidates.

FIG. 2B is a diagram illustrating an example of a search result of second section candidates extending from the plurality of first section candidates.

FIG. 2C is a diagram illustrating an example of a search result of a plurality of the second section candidates extending from the plurality of first section candidates.

FIG. 4A is a diagram illustrating an example of route decision.

FIG. 4B is a diagram illustrating another example of the route decision.

FIG. 5 is a flowchart illustrating an example of route decision processing of the moving object.

FIG. 7A is a flowchart illustrating an example of second translational velocity evaluation processing.

FIG. 7B is a flowchart illustrating an example of second rotational velocity evaluation processing.

DETAILED DESCRIPTION

Figure 3:
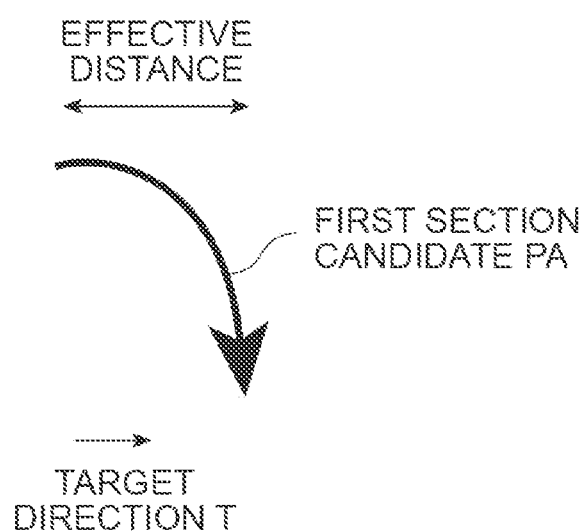
FIG. 3 is a diagram for describing an effective distance in a target direction.

Hereinafter, an embodiment of the present disclosure will be described with reference to the drawings.

FIG. 1 is a block diagram illustrating a moving object according to one embodiment. A moving object 1 illustrated in FIG. 1 is a moving object such as an automobile, a personal mobility device, or a robot that travels on the ground from a current position to a target position. The moving object 1 may be a vehicle that autonomously travels (autonomous driving vehicle), a personal mobility device that autonomously travels, or a robot that autonomously travels.

[Configuration of Moving Object]

A configuration of the moving object 1 according to the present embodiment will be described with reference to the drawings. As illustrated in FIG. 1, the moving object 1 includes a control device 10 that controls the moving object 1.

The control device 10 is an electronic control unit including a central processing unit (CPU) and a storage device. The control device 10 may be configured as a general computer. The storage device may be a read only memory (ROM) and/or a random access memory (RAM) or may be a storage medium such as a hard disk drive (HDD) or a solid state drive (SSD) in a redundant arrays of inexpensive disks (RAID) configuration. The control device 10 may include a communication device such as a network card for external communication. The control device 10 may include an input-output device for exchanging information with a user.

A global navigation satellite system (GNSS) reception unit 2, a radar sensor 3, a camera 4, a velocity sensor 5, an acceleration sensor 6, a rotational velocity sensor 7, and a moving object driving unit 8 are connected to the control device 10.

The GNSS reception unit 2 is provided in the moving object 1 and measures a position of the moving object 1 (for example, a latitude and a longitude of the moving object 1) by receiving signals from four or more GNSS satellites. The GNSS reception unit 2 transmits measured positional information of the moving object 1 to the control device 10. The moving object 1 does not necessarily include the GNSS reception unit 2.

The radar sensor 3 is a detector that is provided in the moving object 1 and detects an obstacle around the moving object 1 using an electromagnetic wave. A millimeter wave radar or light detection and ranging (LiDAR) may be used as the radar sensor 3. The radar sensor 3 transmits a detection result of the obstacle around the moving object 1 to the control device 10.

The camera 4 is an imaging device that is provided in the moving object 1 and captures an image around the moving object 1. The camera 4 transmits the captured image around the moving object 1 to the control device 10. The camera may be a single lens camera, or a stereo camera or a time of flight (TOF) camera that can acquire distance information. The moving object 1 may include at least one of the radar sensor 3 and the camera 4.

The velocity sensor 5 is a detector that detects a translational velocity of the moving object 1. The translational velocity of the moving object 1 is a speed of change in position of the moving object 1. For example, the velocity sensor 5 detects the translational velocity from wheel speeds of the moving object 1. The moving object 1 is not limited to movement by wheels. For example, the moving object 1 may be bipedal or quadrupedal. The velocity sensor 5 transmits a detection result of the translational velocity of the moving object 1 to the control device 10.

The acceleration sensor 6 is a detector that detects an acceleration of the moving object 1. The acceleration sensor 6 may separately detect an acceleration in a forward-rearward direction and an acceleration in a lateral direction for the moving object 1. The acceleration sensor 6 transmits a detection result of the acceleration of the moving object 1 to the control device 10. The moving object 1 does not necessarily include the acceleration sensor 6.

The rotational velocity sensor 7 is a detector that detects a rotational velocity of the moving object 1. The rotational velocity sensor 7 transmits a detection result of the rotational velocity of the moving object 1 to the control device 10. A yaw rate sensor that transmits a yaw rate (rotational angular velocity) instead of the rotational velocity of the moving object 1 may be used.

The moving object driving unit 8 is a driver for causing the moving object 1 to travel. For example, the moving object driving unit 8 is configured to include various actuators that drive wheels of the moving object 1. A configuration of the moving object driving unit 8 is not particularly limited. A configuration corresponding to a type of the moving object 1 is employed.

When the moving object 1 is a vehicle, the moving object driving unit 8 may include an engine actuator, a brake actuator, and a steering actuator. The engine actuator controls driving power of the vehicle by controlling an amount of air supply to an engine of the vehicle in accordance with a control signal from the control device 10 (throttle opening degree). When the vehicle is a hybrid car, the driving power is controlled by inputting the control signal from the control device 10 into a motor as a motive power source in addition to the amount of air supply to the engine. When the vehicle is an electric automobile, the driving power is controlled by inputting the control signal from the control device 10 into the motor as the motive power source.

The brake actuator controls braking power provided to the wheels of the vehicle by controlling a brake system in accordance with the control signal from the control device 10. For example, a hydraulic brake system can be used as the brake system. The steering actuator controls driving of an assist motor that controls steering torque in an electric power steering system of the vehicle in accordance with the control signal from the control device 10. Accordingly, the steering actuator controls the steering torque of the vehicle.

Next, a functional configuration of the control device 10 will be described. As illustrated in FIG. 1, the control device 10 includes a traveling state recognition unit 11, a target direction recognition unit 12, a first section candidate searching unit 13, a second section candidate searching unit 14, an obstacle position recognition unit 15, a route decision unit 16, and a moving object controller 17. An aspect in which a part of functions of the control device 10 described below is calculated in a server capable of communicating with the moving object 1 is also available.

The traveling state recognition unit 11 recognizes a traveling state of the moving object 1. The traveling state includes the translational velocity and the rotational velocity of the moving object 1. The traveling state may include the acceleration of the moving object 1 or include the yaw rate. For example, the traveling state recognition unit 11 recognizes the traveling state of the moving object 1 based on the detection results of the velocity sensor 5, the acceleration sensor 6, and the rotational velocity sensor 7.

The target direction recognition unit 12 recognizes a target direction of the moving object 1 based on the current position of the moving object 1 and a target position set in advance. The target position is a position set in advance as a reaching target of the moving object 1. For example, the target position is set by inputting a target coordinate value in a coordinate plane including the current position of the moving object 1. The target position may be set by the user (a passenger, a manager, or the like) of the moving object 1 or may be autonomously set by the moving object 1 in accordance with a predetermined condition. A setting method of the target position is not particularly limited.

The target direction is a direction in which the target position is present based on the current position of the moving object 1. The target direction corresponds to an extending direction of a straight line connecting the current position to the target position. As an example, the target direction recognition unit 12 recognizes the target direction from the target position (target coordinate value) on the coordinate plane based on the current position of the moving object 1.

The target direction recognition unit 12 may recognize the target direction using map information. The target direction recognition unit 12 recognizes the current position of the moving object 1 on a map from the positional information of the moving object 1 obtained by the GNSS reception unit 2. The target direction recognition unit 12 may recognize the current position of the moving object 1 on the map using dead reckoning or simultaneous localization and mapping (SLAM) technology. The target direction recognition unit 12 can recognize the target direction based on the current position of the moving object 1 on the map and the target position set on the map.

Besides, the target direction recognition unit 12 may recognize the target direction using a magnetic marker provided at the target position and a magnetic marker receiver included in the moving object 1.

The first section candidate searching unit 13 searches for a plurality of first section candidates that are candidates of a first section from the current position of the moving object 1 as a starting point. The first section is a section constituting a traveling route of the moving object 1. The first section candidates are candidates of the first section. The first section candidates are searched as a section in which the moving object 1 can travel from the current position within a first set time period set in advance. The first set time period may be 1 second, 3 seconds, 5 seconds, 10 seconds, 15 seconds, or 1 minute. The first set time period may be a time period corresponding to a control cycle in the control device 10 of the moving object 1. Any time period can be set as the first set time period.

The first section candidate searching unit 13 searches for the first section candidates in which the moving object 1 can travel from the current position within the first set time period using dynamic window approach (DWA). DWA is disclosed in "Fox, D. Burgard, W. Thrun, S.: The dynamic window approach to collision avoidance. IEEE Robotics and automation magazine 4 (1) (1997)". An evaluation function and the like will be described later.

For example, the first section candidate searching unit 13 searches for the first section candidates based on a first velocity condition set in advance. As an example, the first velocity condition is a combination of a translational velocity and a rotational velocity set in advance by the user. For example, the first velocity condition may be set such that the translational velocity is decreased when the rotational velocity becomes greater than or equal to a constant value because of a large curvature. The first velocity condition can be set in accordance with traveling performance of the moving object 1. The first section candidate searching unit 13 may search for a plurality of overlapping first section candidates when the translational velocity and/or the rotational velocity is different.

The first section candidate searching unit 13 searches for the plurality of first section candidates on an assumption that the moving object 1 travels on a flat surface without objects around the moving object 1. In addition, for example, the first section candidate searching unit 13 may search for a plurality of appropriately separated first section candidates by providing an angle condition (for example, a condition using sin or cos).

FIG. 2A is a diagram illustrating an example of a search result of the plurality of first section candidates. In FIG. 2A, first section candidates PA, a starting point Sa (the current position of the moving object 1) of the first section candidates PA, and ending points (reaching points) Ea of the first section candidates PA are illustrated. In FIG. 2A, an XY plane coordinate system is used, and the starting point Sa corresponds to (X, Y):(0, 0). As illustrated in FIG. 2A, the first section candidate searching unit 13 searches for the plurality of first section candidates PA that spread forward of the moving object 1 from the current position of the moving object 1 as the starting point Sa.

While the plurality of first section candidates PA are illustrated in FIG. 2A on an assumption that the moving object 1 can move only forward, the moving object 1 may be able to move in a direction other than a forward direction. For example, when the moving object 1 can move rearward, the plurality of first section candidates PA (the plurality of first section candidates PA that spread in a negative direction of a Y axis) inverted in an X axis direction about the starting point Sa as a center can be additionally searched. When the moving object 1 can move in any direction of 360°, the plurality of first section candidates PA that spread in the directions of 360° about the starting point Sa as a center as in FIG. 2A may be additionally searched. An upper limit may be set for the number of searched first section candidates PA.

The second section candidate searching unit 14 searches for a plurality of second section candidates that are candidates of a second section from each of the ending points Ea of the plurality of first section candidates PA as a starting point. The second section is a section constituting the traveling route of the moving object 1 subsequent to the first section. The second section candidates are searched as a section in which the moving object 1 can travel from the ending points Ea of the first section candidates PA within a second set time period set in advance.

The second set time period may be 1 second, 3 seconds, 5 seconds, 10 seconds, 15 seconds, or 1 minute. The second set time period may be the time period corresponding to the control cycle in the control device 10 of the moving object 1. The second set time period may be the same time period as or a different time period from the first set time period. The second set time period may be a time period longer than the first set time period. Any time period can be set as the second set time period.

The second section candidate searching unit 14 searches for the second section candidates in which the moving object 1 can travel from the ending points Ea of the first section candidates PA within the second set time period using DWA. For example, the second section candidate searching unit 14 searches for the second section candidates based on a second velocity condition set in advance. As an example, the second velocity condition is a combination of a translational velocity and a rotational velocity set in advance by the user. The second velocity condition may be the same as or different from the first velocity condition. The second section candidate searching unit 14 may search for a plurality of overlapping second section candidates when the translational velocity and/or the rotational velocity is different.

The second section candidate searching unit 14 also searches for the plurality of second section candidates on an assumption that the moving object 1 travels on a flat surface without objects around the moving object 1. In addition, for example, the second section candidate searching unit 14 may also search for a plurality of appropriately separated second section candidates by providing an angle condition (for example, a condition using sin or cos).

FIG. 2B is a diagram illustrating an example of a search result of the plurality of second section candidates extending from the first section candidates (only one candidate). Here, only one candidate of the first section candidates is illustrated for easy understanding of description. In FIG. 2B, second section candidates PB, a starting point Sb (the same as the ending point Ea of the first section candidate PA) of the second section candidates PB, and ending points (reaching points) Eb of the second section candidates PB are illustrated.

In FIG. 2B, a case where the plurality of second section candidates PB that extend the first section candidates PA illustrated in FIG. 2A are searched is illustrated. The second section candidate searching unit 14 may search for the second section candidates PB by allowing a change in direction of the moving object 1 at the starting point Sb of the second section candidates PB.

FIG. 2C is a diagram illustrating an example of a search result of the plurality of second section candidates extending from the plurality of first section candidates. In FIG. 2C, reference numerals are omitted for easy understanding of the drawing. For example, as illustrated in FIG. 2C, the second section candidate searching unit 14 searches for the plurality of second section candidates PB in which the moving object 1 can travel from the ending points Ea of the first section candidates PA.

When the moving object 1 can move rearward, the plurality of first section candidates PA and second section candidates PB inverted in the X axis direction about the starting point Sa as a center can be additionally searched. Similarly, when the moving object 1 can move in any direction of 360°, the plurality of first section candidates PA and second section candidates PB that spread in the directions of 360° about the starting point Sa as a center as in FIG. 2C may be additionally searched. An upper limit may be set for the number of searched second section candidates PB.

The obstacle position recognition unit 15 recognizes a position of the obstacle around the moving object 1 based on the detection result of the obstacle by the radar sensor 3 and/or the captured image of the camera 4. The obstacle obstructs movement of the moving object 1. Examples of the obstacle include a structure object such as a wall, an installed object such as a pole, a pedestrian, and other moving objects. The obstacle position recognition unit 15 may recognize the position of the obstacle by communication from an external server (for example, a server of a facility in which the moving object 1 is traveling, or a traffic information server).

The route decision unit 16 decides the first section and the second section used as the traveling route of the moving object 1 from the first section candidates PA and the second section candidates PB based on the target direction recognized by the target direction recognition unit 12 and the position of the obstacle recognized by the obstacle position recognition unit 15.

Specifically, the route decision unit 16 evaluates the first section candidates PA and the second section candidates PB based on the target direction and the position of the obstacle. For example, the route decision unit 16 calculates evaluation values of the first section candidates PA and the second section candidates PB using an evaluation function Ga illustrated as Equation (1) below.

[Equation 1]

$$Ga = a \cdot C + b \cdot L \qquad (1)$$

In Equation (1) above, G denotes the evaluation function, C denotes the closest distance to the obstacle, and L denotes an effective distance in the target direction. The closest distance C to the obstacle is a distance between the obstacle and a location closest to the obstacle in the first section candidate PA and the second section candidate PB of an evaluation target. The closest distance C to the obstacle takes a value of $-\infty$ when the first section candidate PA and the second section candidate PB of the evaluation target are in contact with the obstacle.

L denotes the effective distance (for example, a length when the first section candidate PA is projected in the target direction) in the target direction. Here, FIG. 3 is a diagram for describing the effective distance in the target direction. In FIG. 3, the first section candidate PA and a target direction T are illustrated. As illustrated in FIG. 3, the effective distance in the target direction T corresponds to a proceeding distance of the first section candidate PA in the target direction T. The evaluation is increased as a distance by which the first section candidate PA of the evaluation target proceeds in the target direction T is increased. On the other hand, the evaluation is decreased as the distance by which the first section candidate PA proceeds in the target direction T is decreased. When the first section candidate PA proceeds to the opposite side of the target direction T, the evaluation is negative. Here, a and b denote adjustment parameters. The user sets any values of a and b.

FIG. 4A is a diagram showing an example of route decision. In FIG. 4A, the current position Sa of the moving object 1, a target position G1, a target direction T1, walls (obstacles) W1 to W3, and route candidates C1 to C3 are illustrated. The route candidates C1 to C3 are formed by a combination of the first section candidates PA and the second section candidates PB.

In the situation illustrated in FIG. 4A, the route decision unit 16 calculates the highest evaluation value for the route candidate C3 that is appropriately separated from the walls W1 to W3 and has the longest effective distance in the target direction T1. The route decision unit 16 evaluates the route candidate C3 that slightly approaches the wall W1 but has a long effective distance in the target direction T1 and is approaching the target position G1 higher than the route candidates C1 and C2.

FIG. 4B is a diagram illustrating another example of the route decision. In FIG. 4B, the current position Sa of the moving object 1, a target position G2, a target direction T2, walls (obstacles) W4 to W6, and route candidates C4 to C6 are illustrated. In the situation illustrated in FIG. 4B, the route decision unit 16 calculates the highest evaluation value for the route candidate C6 that is appropriately separated from the walls W4 to W6 and has the longest effective distance in the target direction T2. The route decision unit 16 evaluates the route candidate C6 that is approaching the target position G2 higher than the route candidates C4 and C5 that excessively approach the wall W4 and also have short effective distances in the target direction T2.

The route decision unit 16 may perform the evaluation by considering a change in translational velocity or rotational velocity. Specifically, for example, the route decision unit 16 may calculate the evaluation value of the first section candidate PA using an evaluation function Gb illustrated as Equation (2) below.

[Equation 2]

$$Gb = a \cdot C + b \cdot L + c \cdot Aa \quad (2)$$

Here, c denotes an adjustment parameter. The user sets any value of c. Aa denotes a velocity change determination value for the first section candidates. Other elements are the same as in Equation (1) and thus, will not be described. The velocity change determination value Aa is used for decreasing the evaluation value when a change in translational velocity or rotational velocity of the moving object 1 is greater than or equal to a constant threshold value.

Specifically, the velocity change determination value Aa takes a value of $-\infty$ when a difference (absolute value) between a translational velocity $v_c$ of the moving object 1 at the current position and a first translational velocity $v_1$ that is the translational velocity of the moving object 1 in the first section candidate PA is greater than or equal to a first translational velocity threshold value $v_{max1}$.

In addition, the velocity change determination value Aa takes a value of $-\infty$ when a difference (absolute value) between a rotational velocity $w_c$ of the moving object 1 at the current position and a first rotational velocity $w_1$ that is the rotational velocity of the moving object 1 in the first section candidate PA is greater than or equal to a first rotational velocity threshold value $w_{max1}$. The first translational velocity threshold value $v_{max1}$ and the first rotational velocity threshold value $w_{max1}$ are threshold values having values set in advance. The first translational velocity threshold value $v_{max1}$ may be a value obtained by multiplying the maximum translational acceleration of the moving object 1 by the control cycle of the control device 10. Similarly, the first rotational velocity threshold value $w_{max1}$ may be a value obtained by multiplying the maximum rotational acceleration of the moving object 1 by the control cycle of the control device 10.

The rotational velocity is separated by a rotational direction. For example, the rotational velocity in a right direction is represented as a positive value, and the rotational velocity in a left direction is represented as a negative value. When a difference between the rotational velocities in the same direction is taken, an absolute value of a difference obtained by subtracting a lower value from a higher value is compared with the first rotational velocity threshold value $w_{max1}$. When a difference between the rotational velocities in the opposite directions is taken, both of the rotational velocities are added up as positive values, and the added value is compared with the first rotational velocity threshold value $w_{max1}$ as the difference.

On the other hand, when the difference between the translational velocity $v_c$ of the moving object 1 at the current position and the first translational velocity $v_1$ is less than the first translational velocity threshold value $v_{max1}$, and the difference between the rotational velocity $w_c$ of the moving object 1 at the current position and the first rotational velocity $w_1$ is less than the first rotational velocity threshold value $w_{max1}$, the velocity change determination value Aa takes a value of zero.

By using the evaluation function Gb including the velocity change determination value Aa, the route decision unit 16 can exclude the first section candidate PA in which the moving object 1 has a rapid change in translational velocity or rotational velocity and cannot smoothly travel from the traveling route of the moving object 1.

An aspect in which only one of the translational velocity and the rotational velocity is considered for the velocity change determination value Aa is also available. The velocity change determination value Aa may take a value of $-\infty$ only when the difference between the translational velocity $v_c$ of the moving object 1 at the current position and the first translational velocity $v_1$ is greater than or equal to the first translational velocity threshold value $v_{max1}$, or may take a value of $-\infty$ only when the difference between the rotational velocity $w_c$ of the moving object 1 at the current position and the first rotational velocity $w_1$ is greater than or equal to the first rotational velocity threshold value $w_{max1}$.

In addition, for example, the route decision unit 16 may calculate the evaluation value of the second section candidate PB using an evaluation function Gc illustrated as Equation (3) below.

[Equation 3]

$$Gc = a \cdot C + b \cdot L + c \cdot Ab \quad (3)$$

Here, c denotes an adjustment parameter. Ab denotes a velocity change determination value for the second section candidates. Other elements are the same as in Equation (1) and thus, will not be described. The velocity change determination value Ab takes a value of $-\infty$ when a difference (absolute value) between the first translational velocity $v_1$ that is the translational velocity of the moving object 1 in the first section candidate PA and a second translational velocity $v_2$ that is the translational velocity of the moving object 1 in the second section candidate PB is greater than or equal to a second translational velocity threshold value $v_{max1}$.

In addition, the velocity change determination value Ab takes a value of $-\infty$ when a difference (absolute value) between the first rotational velocity $w_1$ that is the rotational velocity of the moving object 1 in the first section candidate PA and a second rotational velocity $w_2$ that is the rotational velocity of the moving object 1 in the second section candidate PB is greater than or equal to a second rotational velocity threshold value $w_{max2}$. The second translational velocity threshold value $v_{max2}$ and the second rotational velocity threshold value $w_{max2}$ are threshold values having values set in advance. The second translational velocity threshold value $v_{max2}$ may be the same value as or a different value from the first translational velocity threshold value $v_{max1}$. The second rotational velocity threshold value $w_{max2}$ may also be the same value as or a different value from the first rotational velocity threshold value $w_{max1}$.

On the other hand, when the difference between the first translational velocity $v_1$ and the second translational velocity $v_2$ is less than the second translational velocity threshold value $v_{max2}$, and the difference between the first rotational velocity $w_1$ and the second rotational velocity $w_2$ is less than the second rotational velocity threshold value $w_{max2}$, the velocity change determination value Ab takes a value of zero.

By using the evaluation function Gc including the velocity change determination value Ab, the route decision unit 16 can exclude the second section candidate PB in which the moving object 1 has a rapid change in translational velocity or rotational velocity and cannot smoothly travel from the traveling route of the moving object 1.

An aspect in which only one of the translational velocity and the rotational velocity is considered for the velocity change determination value Ab is also available. The velocity change determination value Ab may take a value of $-\infty$ only when the difference between the first translational velocity $v_1$ and the second translational velocity $v_2$ is greater than or equal to the second translational velocity threshold value $v_{max2}$, or may take a value of $-\infty$ only when the difference between the first rotational velocity $w_1$ and the second rotational velocity $w_2$ is greater than or equal to the second rotational velocity threshold value $w_{max2}$.

The route decision unit 16 decides a combination of the first section candidate PA and the second section candidate PB having the highest evaluation value as the first section and the second section from the plurality of first section candidates PA and the plurality of second section candidates PB. The first section and the second section are sections used as the traveling route of the moving object 1.

The route decision unit 16 may decide the first section and the second section in a stepwise manner. Instead of the highest evaluation value (added value) of combinations of the plurality of first section candidates PA and the plurality of second section candidates PB, the route decision unit 16 may decide the first section candidate PA having the highest evaluation value as the first section among the plurality of first section candidates PA and decide the second section candidate PB having the highest evaluation value as the second section among the plurality of second section candidates PB from the ending point of the first section as a starting point.

The route decision unit 16 does not need to obtain the route reaching the target position from the current position and may obtain a route (a part of the route reaching the target position) toward the target position. The route decision unit 16 repeats the decision of the first section and the second section as the route in constant cycles. The route decision unit 16 may newly decide the first section and the second section (update the route) in the middle of traveling of the moving object 1 in the first section and the second section that has been decided once.

The moving object controller 17 controls the traveling of the moving object 1. The moving object controller 17 calculates a driving amount (for example, a wheel driving amount) for the traveling of the moving object 1 from the route decided by the route decision unit 16. The moving object controller 17 performs a traveling control of the moving object 1 along the route by transmitting a control signal corresponding to the calculated driving amount to the moving object driving unit 8.

For example, when the moving object 1 includes a moving mechanism of two facing wheels in which left and right wheels are arranged to face each other on a shaft, the moving object controller 17 calculates the numbers of rotations of the left and right wheels. Specifically, the moving object controller 17 may obtain a number of rotations rl of the left wheel and a number of rotations rr of the right wheel using a translational velocity v and a rotational velocity w in the first section and Equations (4) and (5) below.

[Equation 4]

$$rl = v/(2\pi R) + (0.5H \cdot w)/(2\pi R) \qquad (4)$$

$$rr = v/(2\pi R) - (0.5H \cdot w)/(2\pi R) \qquad (5)$$

In Equations (4) and (5) above, R denotes a wheel radius of the moving object 1, and H denotes a tread (a distance between centers of the wheels) of the moving object 1. The moving object controller 17 performs the traveling control of the moving object 1 along the route by transmitting the number of rotations rl of the left wheel and the number of rotations rr of the right wheel calculated using Equations (4) and (5) above to the moving object driving unit 8 as the control signal.

[Route Decision Method of Moving Object]

Next, a route decision method of the moving object 1 according to the present embodiment will be described with reference to the drawings. FIG. 5 is a flowchart illustrating an example of route decision processing of the moving object 1.

As illustrated in FIG. 5, in S1, the control device 10 of the moving object 1 recognizes the target direction of the moving object 1 by the target direction recognition unit 12 (target direction recognition step). For example, the target direction recognition unit 12 recognizes the target direction of the moving object 1 based on the current position of the moving object 1 and the target position set in advance.

In S2, the control device 10 searches for the plurality of first section candidates PA by the first section candidate searching unit 13 (first section candidate searching step). The first section candidate searching unit 13 searches for the plurality of first section candidates PA in which the moving object 1 can travel from the current position within the first set time period set in advance, from the current position of the moving object 1 as the starting point.

In S3, the control device 10 searches for the plurality of second section candidates PB by the second section candidate searching unit 14 (second section candidate searching step). The second section candidate searching unit 14 searches for the plurality of second section candidates PB in which the moving object 1 can travel from the ending points Ea of the first section candidates PA within the second set time period set in advance, from the ending points Ea of the plurality of first section candidates PA as the starting point.

In S4, the control device 10 recognizes the position of the obstacle around the moving object 1 by the obstacle position recognition unit 15 (obstacle position recognition step). For example, the obstacle position recognition unit 15 recognizes the position of the obstacle around the moving object 1 based on the detection result of the obstacle by the radar sensor 3 and/or the captured image of the camera 4.

In S5, the control device 10 calculates the evaluation value by the route decision unit 16. The route decision unit 16 evaluates the first section candidates PA and the second section candidates PB based on the target direction and the position of the obstacle (evaluation step). For example, the route decision unit 16 calculates the evaluation values of the first section candidates PA and the second section candidates PB using the evaluation function Ga illustrated as Equation (1) above.

In S6, the control device 10 performs the route decision (decides the first section and the second section) by the route decision unit 16 (route decision step). For example, the route decision unit 16 decides the combination of the first section candidate PA and the second section candidate PB having the highest evaluation value as the first section and the second section from the plurality of first section candidates PA and the plurality of second section candidates PB.

In S7, the control device 10 performs the traveling control of the moving object 1 by the moving object controller 17 (traveling control step). The moving object controller 17 controls the moving object 1 to travel along the route decided by the route decision unit 16 by transmitting the control signal to the moving object driving unit 8.

Figure 6A:
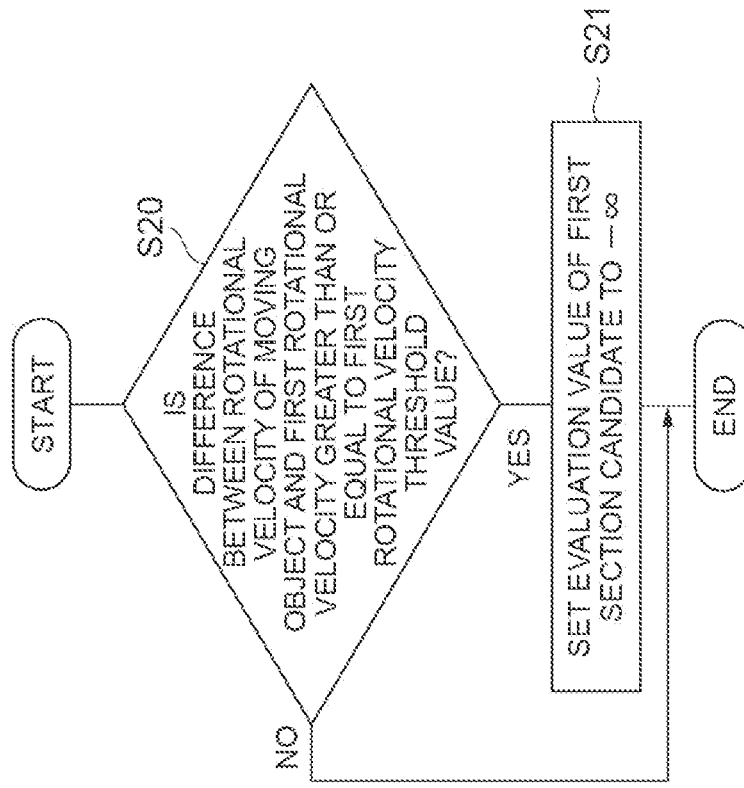
FIG. 6A is a flowchart illustrating an example of first translational velocity evaluation processing.

FIG. 6A is a flowchart illustrating an example of first translational velocity evaluation processing. The first translational velocity evaluation processing is executed in S5 of the flowchart illustrated in FIG. 5.

As illustrated in FIG. 6A, in S10, the control device 10 determines whether or not the difference (absolute value) between the translational velocity $v_c$ of the moving object 1 at the current position and the first translational velocity $v_1$ that is the translational velocity of the moving object 1 in the first section candidate PA is greater than or equal to the first translational velocity threshold value $v_{max1}$ by the route decision unit 16 (first translational velocity determination step).

When the difference is determined as being greater than or equal to the first translational velocity threshold value $v_{max1}$ (S10: YES), the control device 10 transitions to S11. When the difference is not determined as being greater than or equal to the first translational velocity threshold value $v_{max1}$ (S10: NO), the control device 10 finishes the first translational velocity evaluation processing.

In S11, the control device 10 sets the evaluation value of the first section candidate PA (the first section candidate PA for which a YES determination is made in S10) to $-\infty$ by the route decision unit 16 (first translational velocity evaluation step). For example, the route decision unit 16 sets the evaluation value of the corresponding first section candidate PA to $-\infty$ to make the first section candidate PA not selectable as the first section by setting the value of the velocity change determination value Aa in Equation (2) above to $-\infty$.

Figure 6B:
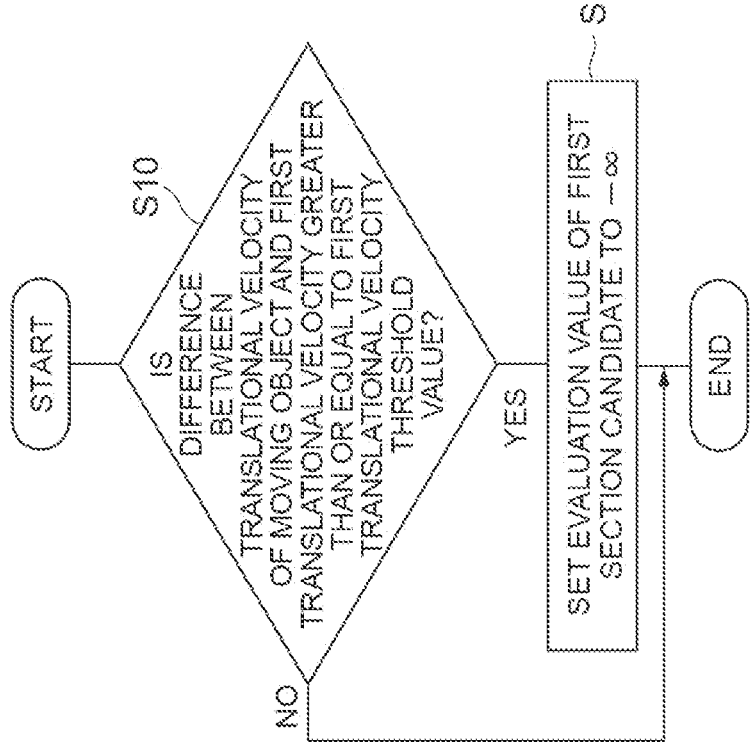
FIG. 6B is a flowchart illustrating an example of first rotational velocity evaluation processing.

FIG. 6B is a flowchart illustrating an example of first rotational velocity evaluation processing. The first rotational velocity evaluation processing is executed in S5 of the flowchart illustrated in FIG. 5.

As illustrated in FIG. 6B, in S20, the control device 10 determines whether or not the difference (absolute value) between the rotational velocity $w_c$ of the moving object 1 at the current position and the first rotational velocity $w_1$ that is the rotational velocity of the moving object 1 in the first section candidate PA is greater than or equal to the first rotational velocity threshold value $w_{max1}$ by the Route Decision Unit 16 (first rotational velocity determination step).

When the difference is determined as being greater than or equal to the first rotational velocity threshold value $w_{max1}$ (S20: YES), the control device 10 transitions to S21. When the difference is not determined as being greater than or equal to the first rotational velocity threshold value $w_{max1}$ (S20: NO), the control device 10 finishes the first rotational velocity evaluation processing.

In S21, the control device 10 sets the evaluation value of the first section candidate PA (the first section candidate PA for which a YES determination is made in S20) to $-\infty$ by the route decision unit 16 (first rotational velocity evaluation step). For example, the route decision unit 16 sets the evaluation value of the corresponding first section candidate PA to $-\infty$ to make the first section candidate PA not selectable as the first section by setting the value of the velocity change determination value Aa in Equation (2) above to $-\infty$.

FIG. 7A is a flowchart illustrating an example of second translational velocity evaluation processing. The second translational velocity evaluation processing is executed in S5 of the flowchart illustrated in FIG. 5.

As illustrated in FIG. 7A, in S30, the control device 10 determines whether or not the difference (absolute value) between the first translational velocity $v_1$ that is the translational velocity of the moving object 1 in the first section candidate PA and the second translational velocity $v_2$ that is the translational velocity of the moving object 1 in the second section candidate PB is greater than or equal to the second translational velocity threshold value $v_{max2}$ by the route decision unit 16 (second translational velocity determination step).

When the difference is determined as being greater than or equal to the second translational velocity threshold value $v_{max2}$ (S30: YES), the control device 10 transitions to S31. When the difference is not determined as being greater than or equal to the second translational velocity threshold value $v_{max2}$ (S30: NO), the control device 10 finishes the second translational velocity evaluation processing.

In S31, the control device 10 sets the evaluation value of the second section candidate PB (the second section candidate PB for which a YES determination is made in S30) to $-\infty$ by the route decision unit 16 (second translational velocity evaluation step). For example, the route decision unit 16 sets the evaluation value of the corresponding second section candidate PB to $-\infty$ to make the second section candidate PB not selectable as the second section by setting the value of the velocity change determination value Ab in Equation (3) above to $-\infty$.

FIG. 7B is a flowchart illustrating an example of second rotational velocity evaluation processing. The second rotational velocity evaluation processing is executed in S5 of the flowchart illustrated in FIG. 5.

As illustrated in FIG. 7B, in S40, the control device 10 determines whether or not the difference (absolute value) between the first rotational velocity $w_1$ that is the rotational velocity of the moving object 1 in the first section candidate PA and the second rotational velocity $w_2$ that is the rotational velocity of the moving object 1 in the second section candidate PB is greater than or equal to the second rotational velocity threshold value $w_{max2}$ by the route decision unit 16 (second rotational velocity determination step).

When the difference is determined as being greater than or equal to the second rotational velocity threshold value $w_{max2}$ (S40: YES), the control device 10 transitions to S41. When the difference is not determined as being greater than or equal to the second rotational velocity threshold value $w_{max2}$ (S40: NO), the control device 10 finishes the second rotational velocity evaluation processing.

In S41, the control device 10 sets the evaluation value of the second section candidate PB (the second section candidate PB for which a YES determination is made in S40) to $-\infty$ by the route decision unit 16 (second rotational velocity evaluation step). For example, the route decision unit 16 sets the evaluation value of the corresponding second section candidate PB to $-\infty$ to make the second section candidate PB not selectable as the second section by setting the value of the velocity change determination value Ab in Equation (3) above to $-\infty$.

According to the moving object 1 (and the route decision method of the moving object 1) according to the present embodiment described above, by searching for the route including at least the first section candidates PA and the second section candidates PB in multiple steps using DWA to decide the first section and the second section used as the traveling route of the moving object 1 based on the target direction and the position of the obstacle, a route that has high flexibility and can be smoothly traveled by the moving object 1 can be obtained compared to the technology of the related art in which the route is searched in only one step.

Figure 8A:
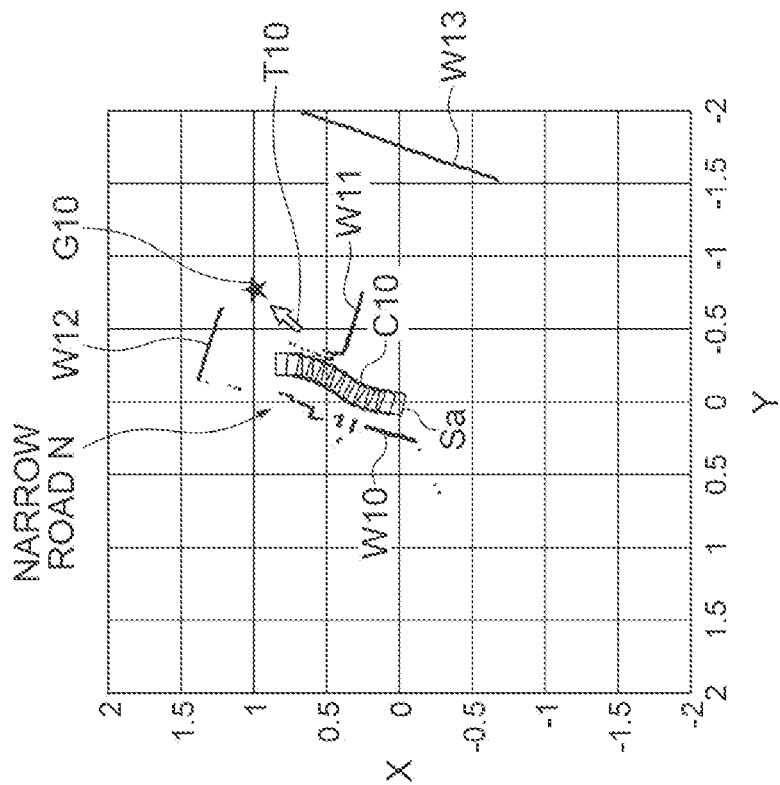
FIG. 8A is a diagram illustrating an example of a route searched using the technology of the related art.

Here, FIG. 8A is a diagram illustrating an example of the route searched using a route decision method of a moving object of the related art. In FIG. 8A, the current position Sa of the moving object of the related art, a route CZ, a target position G10, a target direction T10, a narrow road N, and walls (obstacles) W10 to W13 are illustrated. As illustrated in FIG. 8A, in the moving object of the related art in which the route is searched in only one step, a route that enters the narrow road N formed by the wall W10 and the wall W11 may not be searched.

Figure 8B:
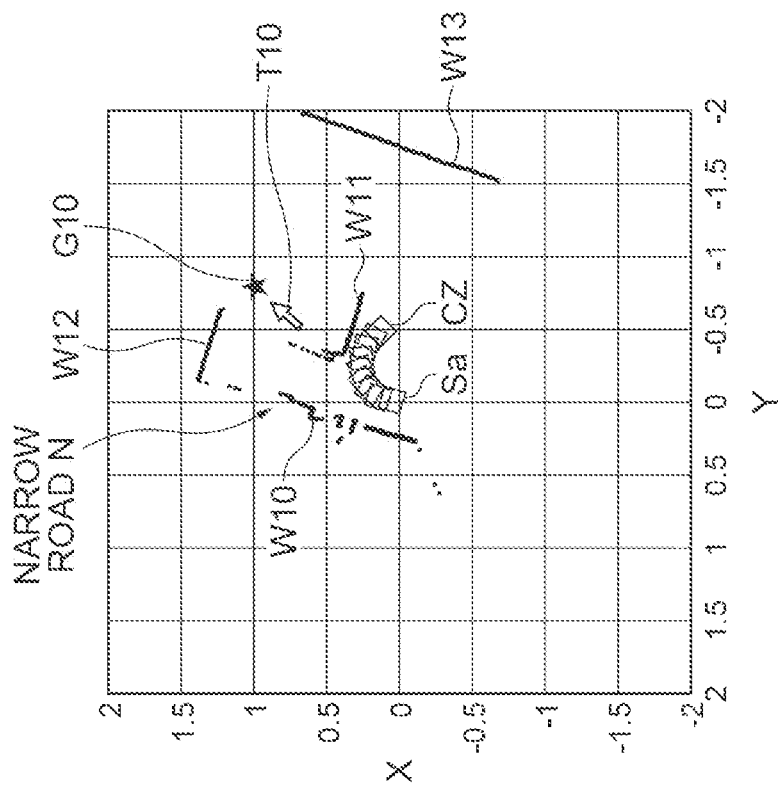
FIG. 8B is a diagram illustrating an example of a route of the moving object according to the present embodiment.

FIG. 8B is a diagram illustrating an example of the route of the moving object 1 according to the present embodiment. In FIG. 8B, a route C10 of the moving object 1 is illustrated. As illustrated in FIG. 8B, according to the moving object 1, a route that has flexibility capable of handling the narrow road N and can be smoothly traveled by the moving object 1 can be obtained by searching for the route in multiple steps using DWA. The moving object 1 can obtain a route that can smoothly implement passing through the obstacle and passing by the obstacle.

In addition, according to the moving object 1, by deciding the first section for which the difference between the translational velocity $v_c$ of the moving object 1 at the current position and the first translational velocity $v_1$ that is the translational velocity of the moving object 1 in the first section candidate PA is less than the first translational velocity threshold value $v_{max1}$, the first section in which the moving object 1 can smoothly move can be selected compared to when a change in translational velocity is not considered.

Similarly, according to the moving object 1, by deciding the first section for which the difference between the rotational velocity $w_c$ of the moving object 1 at the current position and the first rotational velocity $w_1$ that is the rotational velocity of the moving object 1 in the first section candidate PA is less than the first rotational velocity threshold value $w_{max1}$, the first section in which the moving object can smoothly move can be selected compared to when a change in rotational velocity is not considered.

In addition, according to the moving object 1, by deciding the second section for which the difference between the first translational velocity $v_1$ that is the translational velocity of the moving object 1 in the first section candidate PA and the second translational velocity $v_2$ that is the translational velocity of the moving object 1 in the second section candidate PB is less than the second translational velocity threshold value $v_{max2}$, the second section in which the moving object 1 can smoothly move can be selected compared to when changes in translational velocity of the first section and the second section are not considered.

Similarly, according to the moving object 1, by deciding the second section for which the difference between the first rotational velocity $w_1$ that is the rotational velocity of the moving object 1 in the first section candidate PA and the second rotational velocity $w_2$ that is the rotational velocity of the moving object 1 in the second section candidate PB is less than the second rotational velocity threshold value $w_{max2}$, the second section in which the moving object can smoothly move can be selected compared to when changes in rotational velocity of the first section and the second section are not considered.

While the embodiment of the present disclosure is described above, the present disclosure is not limited to the above embodiment. The present disclosure can be embodied in various forms obtained by carrying out various modifications and improvements to the embodiment based on the knowledge of those skilled in the art.

The moving object 1 may further include a third section candidate searching unit that searches for a plurality of third section candidates in which the moving object 1 can travel within a third set time period set in advance from the ending points Eb of the second section candidates PB as a starting point. In this case, the route decision unit 16 decides a third section as the traveling route of the moving object 1 by calculating evaluation values of the plurality of third section candidates in the same manner as the second section candidates PB. The moving object 1 may further include a fourth section candidate searching unit and a fifth section candidate searching unit.

The route decision unit 16 may calculate the evaluation values of the first section candidates PA and the second section candidates PB using the driving amount (for example, the wheel driving amount) of the moving object 1 previously calculated by the moving object controller 17. For example, in the same manner as the translational velocity and the rotational velocity, the route decision unit 16 decides the first section for which a difference between the previously calculated driving amount of the moving object 1 and the driving amount of the moving object 1 necessary for implementing the translational velocity in the first section candidate PA is less than a threshold value.

When performing the evaluation in which a change in translational velocity or rotational velocity is considered, the route decision unit 16 does not necessarily set the evaluation value of the first section candidate PA having a significant change in translational velocity to $-\infty$. The route decision unit 16 may simply exclude the first section candidate PA for which the difference between the translational velocity $v_c$ of the moving object 1 at the current position and the first translational velocity $v_1$ is greater than or equal to the first translational velocity threshold value $v_{max1}$ from the evaluation target. The same applies to the rotational velocity. In addition, the same applies to the second section candidate PB.

The route decision unit 16 may set the target direction when evaluating the second section candidate PB as a direction in which the target position seen from the starting point Sb of the second section candidate PB (the ending point Ea of the first section candidate PA) is present. Instead of using the target direction for the first section candidate PA (a direction in which the target position seen from the current position of the moving object 1 is present) in the evaluation of the second section candidate PB, the route decision unit 16 uses the target direction that is the direction in which the target position seen from the starting point Sb of the second section candidate PB is present, and calculates a higher evaluation value for the second section candidate PB as the effective distance in the target direction is increased. Accordingly, the route decision unit 16 can finally calculate a higher evaluation value for the second section candidate PB that approaches the target position more, without being affected by a difference in position between the current position Sa of the moving object and the starting point Sb of the second section candidate PB.

What is claimed is:

1. A moving object that travels from a current position toward a target position, the moving object comprising a central processing unit configured to:
   search for a plurality of first section candidates in which the moving object is capable of traveling from the current position within a first set time period set in advance;
   for each ending point of the first section candidates, search for a plurality of second section candidates in which the moving object is capable of traveling from the ending points of the first section candidates within a second set time period set in advance;
   recognize a target direction that is a direction in which the target position is present;
   detect a position of an obstacle around the moving object;
   determine an evaluation value for each of the first section candidates and each of the second section candidates based on a closest distance to the obstacle, a rotational speed of the moving object, and an effective distance in the target direction;
   decide a first section and a second section used as a traveling route of the moving object from the plurality of first section candidates and the plurality of second section candidates having a highest evaluation value;
   calculate a driving amount for the traveling of the moving object from the decided route; and
   perform traveling control of the moving object along the route by transmitting a control signal to control traveling of the moving object.

2. The moving object according to claim 1, wherein the central processing unit is further configured to:
   recognize a translational velocity of the moving object at the current position,
   decide the first section for which a difference between the translational velocity of the moving object at the current position and a first translational velocity that is a translational velocity of the moving object in the plurality of first section candidates is less than a first translational velocity threshold value.

3. The moving object according to claim 1, wherein the central processing unit is further configured to:
   recognize a rotational velocity of the moving object at the current position,
   decide the first section for which a difference between the rotational velocity of the moving object at the current position and a first rotational velocity that is a rotational velocity of the moving object in the plurality of first section candidates is less than a first rotational velocity threshold value.

4. The moving object according to claim 1,
wherein the central processing unit is configured to decide the second section for which a difference between a second translational velocity that is a translational velocity of the moving object in the plurality of second section candidates from an ending point of the decided first section as a starting point and a first translational velocity that is a translational velocity of the moving object in the first section is less than a second translational velocity threshold value.

5. The moving object according to claim 2,
wherein the central processing unit is configured to decide the second section for which a difference between a second translational velocity that is a translational velocity of the moving object in the plurality of second section candidates from an ending point of the decided first section as a starting point and a first translational velocity that is a translational velocity of the moving object in the first section is less than a second translational velocity threshold value.

6. The moving object according to claim 1,
wherein the central processing unit is configured to decide the second section for which a difference between a second rotational velocity that is a rotational velocity of the moving object in the plurality of second section candidates from an ending point of the decided first section as a starting point and a first rotational velocity that is a rotational velocity of the moving object in the first section is less than a second rotational velocity threshold value.

7. The moving object according to claim 3,
wherein the central processing unit is configured to decide the second section for which a difference between a second rotational velocity that is a rotational velocity of the moving object in the plurality of second section candidates from an ending point of the decided first section as a starting point and a first rotational velocity that is a rotational velocity of the moving object in the first section is less than a second rotational velocity threshold value.

8. A route decision method of a moving object that travels from a current position toward a target position, the route decision method comprising:
   searching for a plurality of first section candidates in which the moving object is capable of traveling from the current position within a first set time period set in advance;
   searching, for each ending point of the first section candidates, for a plurality of second section candidates in which the moving object is capable of traveling from the ending points of the first section candidates within a second set time period set in advance;
   recognizing a target direction that is a direction in which the target position is present;
   detecting a position of an obstacle around the moving object;

determining an evaluation value for each of the first section candidates and each of the second section candidates based on a closest distance to the obstacle, a rotational speed of the moving object, and an effective distance in the target direction;
deciding a first section and a second section used as a traveling route of the moving object from the plurality of first section candidates and the plurality of second section candidates having a highest evaluation value;
calculating a driving amount for the traveling of the moving object from the decided route; and
performing traveling control of the moving object along the route by transmitting a control signal to control traveling of the moving object.

* * * * *